United States Patent [19]

Shim

[11] 3,862,275

[45] Jan. 21, 1975

[54] METHOD OF PREPARING POLYALKYLENE GLYCOL ALKYL POLYPHOSPHITES

[75] Inventor: Kyung Sup Shim, Irvington, N.Y.

[73] Assignee: Stauffer Chemical Company, New York, N.Y.

[22] Filed: Nov. 8, 1971

[21] Appl. No.: 198,026

[52] U.S. Cl. ............. 260/982, 260/2.5 AJ, 260/928
[51] Int. Cl. ............................................. C07f 9/08
[58] Field of Search ............................. 260/982, 928

[56] References Cited
UNITED STATES PATENTS
3,442,982   5/1969   Friedman...................... 260/928 X Primary Examiner—Lorraine A. Weinberger
Assistant Examiner—Richard L. Raymond

[57] ABSTRACT

An improved process for preparing polyalkylene glycol alkyl polyphosphites involving a two-step procedure comprising reacting a polyalkylene glycol with a tertiary alkyl phosphite in a mole ratio of at least 2 moles of said phosphite for each mole of said glycol and reacting the product thereof with about an equimolar quantity of the same polyalkylene glycol. The resultant polyalkylene glycol alkyl polyphosphites are useful as flame retardants and also as intermediates for flame retardants, especially well suited for flexible urethane foams.

4 Claims, No Drawings

METHOD OF PREPARING POLYALKYLENE GLYCOL ALKYL POLYPHOSPHITES

BACKGROUND OF THE INVENTION

This invention relates to polyalkylene glycol alkyl polyphosphites and more particularly to an improved process for the synthesis thereof.

In the polyurethane field, increased interest is being shown in compounds which can be added to the polyurethane polymers to act as flame retardant agents. Particular interest is being shown in compounds which have functional groups reactive with the polyol or polyisocyanate used in preparing the polyurethane so that the flame retardant agent can be compolymerized into the polymer chain. One such group of reactive flame retardants are the polyalkylene glycol alkyl polyphosphites disclosed in copending U.S. application Ser. No. 166,295 entitled "Polyalkylene Glycol Alkyl Polyphosphites" by S. L. Giolito. While these polyalkylene glycol alkyl polyphosphites have been found to be useful flame retardants and also to be especially well suited as intermediates for flame retardants for flexible urethane foams, their preparation has at times presented some difficulty. In particular, this prior method of preparation, which involves a single step transesterification reaction of a tertiary alkyl phosphite with a polyalkylene glycol in a mole ratio of from 1 to 1.5 moles of phosphite per mole of glycol, often results in a jelly-like product rather than a preferred viscous liquid. The gel product, which is apparently the result of crosslinking, must be additionally treated, such as with benzene, in order to obtain the product in a form which is more suitable for use. This treatment is often tedious and time-consuming since these gels are very difficult to dissolve and breakdown. Thus, it has become desirable to provide a process which minimizes or completely eliminates the formation of these gelling effects.

SUMMARY OF THE INVENTION

Accordingly, it is one object of the present invention to provide an improved process for the preparation of polyalkylene glycol alkyl polyphosphites.

A still further object of this invention is to provide a process for the preparation of polyalkylene glycol alkyl polyphosphites which yield a product in an improved physical form.

These and other objects will become more apparent from a reading of the following detailed description.

DETAILED DESCRIPTION OF THE PREFERRED EMBODIMENTS

It has been found that polyalkylene glycol alkyl polyphosphites can be prepared in improved physical form by a distinct two-stage transesterification reaction comprising initially contacting a polyalkylene glycol with a tertiary alkyl phosphite in a 1:2 mole ratio respectively and subsequently treating the reaction product thereof with additional polyalkylene glycol. Thus, using dipropylene glycol (DPG) and trimethyl phosphite (TMP) as illustrative of the starting reactants, the process of the present invention may be represented picturally in the following manner:

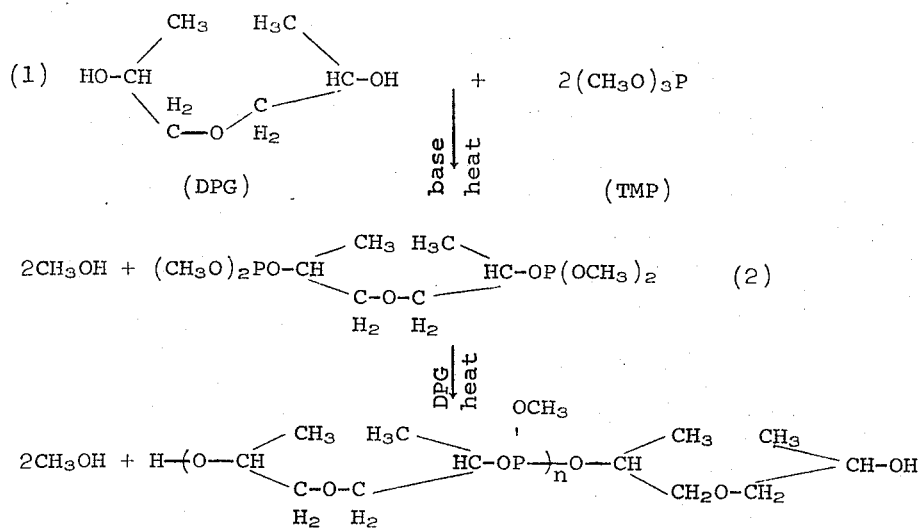

The initial transesterification reaction of step (1) above is carried out by mixing the tertiary alkyl phosphite and polyalkylene glycol in the presence of any of the well known transesterification strong base catalysts. Particularly useful catalysts are the alkali metal alcoholates and phenolates such as sodium methylate, sodium decylate, sodium phenolate and the like. Moreover, other useful catalysts include, for example, tertiary amines such as triethyl amine, pyridine and the like. These catalysts are normally employed in an amount of from about 0.01 to about 10 percent, by weight, of entire reactant mixture. Initially the reaction temperature should be kept below the boiling point of the lowest boiling reactant (usually the phosphite) in order to avoid the loss of that reactant. Although the reaction can be conducted at room temperature, i.e., 20°C., it is preferred to conduct it as close to the upper limit as possible in order to increase the rate of reaction. Thus, in the case where trimethyl phosphite is employed as the tertiary alkyl phosphite, the reaction temperature is preferably within the range of from about 80°C. to about 100°C. and should not be permitted to rise above 105°C. until the evolution of methanol is substantially terminated. Accordingly, depending upon the particular tertiary alkyl phosphite being used, the reaction temperature of step (1) above is preferably within the range of from about 80°C. to about 200°C.

The ratio of reactants, i.e., glycol to phosphite, utilized in the reaction of step (1) above is generally in the range of from about 1:2 to about 1:10 respectively. Obviously, at least a 1:2 ratio of glycol to phosphite must be employed in order to obtain the desired partially transesterified phosphite product of step (1) as illustrated above. Preferably, however, an excess of the tertiary alkyl phosphite is used. Accordingly, while a 1:5 mole ratio of glycol to tertiary alkyl phosphite is most preferred, any excess of tertiary alkyl phosphite is obviously acceptable. This partial transesterification reaction of step (1) above is completed when about two moles of alkanol, e.g., methanol, have been evolved. The excess tertiary alkyl phosphite and the other volatiles are removed from the reaction mixture, generally under reduced pressure, leaving the relatively non-volatile polyalkylene glycol phosphite product.

The final transesterification reaction, as exemplified by step (2) above, is carried out by reacting this resultant polyalkylene glycol phosphite of step (1) with the same quantity of the same polyalkylene glycol used in step (1) of the process. As is the case with the initial transesterification reaction of step (1), a strong base transesterification catalyst as described above is also preferably utilized in step (2). Since none of the reactants here is volatile, the reaction temperature is not dependent thereon and is generally within the range of from about 80° C. to about 200° C. This final transesterification is also completed after about two moles of alkanol have evolved. The degree of polymerization can be controlled to an extent by varying the time of the reaction and the polymer length can be monitored by measuring the viscosity build-up during the reaction according to well known teachings. The polyalkylene glycol alkyl polyphosphite product is distilled off as a viscous liquid and further purified by stripping off any remaining alkanol and/or other volatiles under reduced pressure.

Both transesterification reaction steps, as described above, may optionally be carried out in the presence of an inert solvent, however, such solvent is not required for the practice of the present invention. The term inert solvent is meant to disignate any solvent which does not react with the reactants of the present invention. Suitable solvents include the alkylated benzenes such as ethyl benzene, diethyl benzene, toluene, xylenes and the like. The polyalkylene glycols referred to above which are suitable as reactants in the process of the present invention are represented by the following formula:

$$HO-(R''O)_m-H \qquad (I)$$

wherein R'' is an alkylene group of from 2 to about 20 carbon atoms, said alkylene group being straight or branch chained or mixtures thereof, and m designates the number of repeating alkylene ether units and is normally 2 to about 20. Illustrative of these polyalkylene glycols are the following: diethylene glycol, triethylene glycol, dipropylene glycol, tripropylene glycol, tributylene glycol, polyethylene glycols wherein the average number of ether units is 2, polypropylene glycols wherein the average number of ether units is 14, trihexylene glycol and the like. Particularly preferred glycols are diethylene glycol, dipropylene glycol and tripropylene glycol. It is understood that these propylene glycols can be primary, secondary or mixtures thereof.

The tertiary alkyl phosphites referred to above and employed in the present process have the general formula:

(II)

wherein $R_1$ is alkyl, preferably $C_1$–$C_{10}$ alkyl and most preferably methyl or ethyl. These phosphites are illustrated by the following: trimethyl phosphite, triethyl phosphite, tripropyl phosphite, tributyl phosphite, trioctyl phosphite, dimethyl ethyl phosphite, diethyl methyl phosphite, and the like. Trimethyl and triethyl phosphite are particularly preferred, with trimethyl phosphite being most preferred.

Accordingly, a general idealized structure for the flame retardant polyalkylene glycol alkyl polyphosphites prepared by the process of this invention is as follows:

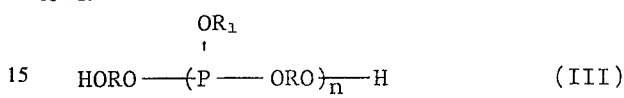

(III)

where $R_1$ is as described above, R is a polyalkylene glycol residue and n is a number in the range from about 2 to about 50 and preferably from about 4 to about 10. The term polyalkylene glycol residue, designated by $R_1$ is meant to define that portion remaining after two hydroxyl units have been removed from the polyalkylene glycol represented by Formula I above. These polyalkylene glycol alkyl polyphosphites are generally characterized by their low acidity and their relatively low OH number i.e., normally below 200 and preferably below 100. It is understood that this idealized structure is intended to cover mixtures of polyphosphites having an average chain length of n rather than just pure compounds.

Having generally described the invention, the following example is given for purposes of illustration. It will be understood that the invention is not limited to this example but is susceptible to different modifications that will be recognized by one of ordinary skill in the art.

EXAMPLE I

To a 5 liter flash equipped with mechanical stirrer, thermometer and distillation head is placed 670 grams (5 moles) dipropylene glycol, 3100 grams (25 moles) trimethylphosphite and 1.0 grams of sodium methoxide. The reaction mixture is heated to 100°C and 320 grams (10 moles) of methanol are evolved and removed. The excess trimethylphosphite is stripped off at 110°C. under a reduced pressure of 20 millimeters of mercury. To the remaining product is added 670 grams (5 moles) of dipropylene glycol and the resultant reaction mixture is heated slowly to 120°C. while the volatile components are removed. The residual methanol is removed at 110°C. under a reduced pressure of 20 millimeters of mecury leaving 1,821 grams of a clear colorless viscous liquid product. Gelling does not occur. Analysis of the product showed it to be poly (dipropylene glycol methyl phosphite) having an OH number less than 100 and containing 13.8 percent phosphorus.

Similar results are obtained when triethylene glycol or tripropylene glycol and triethylphosphite are substituted for the dipropylene glycol and trimethylphosphite respectively in this example.

What is claimed is:

1. A process for preparing liquid polyalkylene glycol polyphosphites comprising the steps of:
    a. reacting a polyalkylene glycol with a tertiary alkyl phosphite in a mole ratio of at least two moles of said phosphite for each mole of said glycol in the presence of a transesterification catalyst and at a temperature in the range of from about 80° C. to about 200°C., and
    b. adding to and reacting with the resultant polyalkylene glycol phosphite product of step (a) an additional mole of said glycol for each mole of glycol used in step (a) in the presence of a transesterification catalyst and at a temperature in the range of from about 80°C. to about 200°C.

2. The process of claim 1 wherein an excess of said tertiary alkyl phosphite is used in step (a).

3. The process of claim 2 wherein said tertiary alkyl phosphite is a $C_1$-$C_{10}$ trialkyl phosphite and said polyalkylene glycol is selected from the group consisting of diethylene glycol, dipropylene glycol, tripropylene glycol, and triethylene glycol.

4. The process of claim 3 wherein said trialkyl phosphite is trimethyl phosphite and said polyalkylene glycol is dipropylene glycol.

* * * * *